United States Patent
Shi et al.

(10) Patent No.: US 12,133,233 B2
(45) Date of Patent: Oct. 29, 2024

(54) DATA TRANSMISSION METHOD, TERMINAL DEVICE AND STORAGE MEDIUM

(71) Applicant: GUANGDONG OPPO MOBILE TELECOMMUNICATIONS CORP., LTD., Dongguan (CN)

(72) Inventors: Cong Shi, Dongguan (CN); Zhe Fu, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 358 days.

(21) Appl. No.: 17/557,374

(22) Filed: Dec. 21, 2021

(65) Prior Publication Data
US 2022/0116988 A1  Apr. 14, 2022

Related U.S. Application Data

(63) Continuation of application No. PCT/CN2019/099871, filed on Aug. 8, 2019.

(51) Int. Cl.
*H04W 4/00* (2018.01)
*H04L 1/08* (2006.01)
(Continued)

(52) U.S. Cl.
CPC ............. *H04W 72/23* (2023.01); *H04L 1/08* (2013.01); *H04L 1/1812* (2013.01)

(58) Field of Classification Search
CPC ........ H04W 72/23; H04L 1/08; H04L 1/1812; H04L 1/1883; H04L 1/1887; H04L 1/189;
(Continued)

(56) References Cited

U.S. PATENT DOCUMENTS

2018/0294927 A1* 10/2018 Takeda ................. H04L 1/1861
2019/0081743 A1*  3/2019 Loehr .................. H04W 76/28
2021/0076409 A1*  3/2021 Goto .................. H04W 72/1268

FOREIGN PATENT DOCUMENTS

CN   101132262 A   2/2008
CN   102077502 A   5/2011
(Continued)

OTHER PUBLICATIONS

Extended European Search Report issued in corresponding European Application No. 19940815.4, mailed May 9, 2022, 10 pages.
(Continued)

*Primary Examiner* — Edan Orgad
*Assistant Examiner* — Hidayat Dabiri
(74) *Attorney, Agent, or Firm* — BAYES PLLC (57) ABSTRACT

The present disclosure discloses a data transmission method, comprising: a terminal device determines, according to the states of a first timer and a second timer corresponding to a hybrid automatic repeat request (HARQ) process, whether the HARQ process corresponding to a first configuration authorization resource is available for transmitting data to be transmitted; during the operation of the first timer, the terminal device does not perform a new transmission on the HARQ process; and during the operation of the second timer, the terminal device does not perform retransmission on the HARQ process. The present disclosure further discloses a terminal device and a storage medium.

18 Claims, 3 Drawing Sheets determining, by a terminal device, according to states of a first timer and a second timer corresponding to a HARQ process, whether the HARQ process corresponding to a first configured grant resource is available for transmitting data to be transmitted — S201 determining a transmission manner of the data to be transmitted according to the states of the first timer and the second timer in the case where the HARQ process corresponding to the first configured grant resource is available for transmitting the data to be transmitted — S202 controlling, by the terminal device, transmission of the data to be transmitted according to the transmission manner — S203

(51) Int. Cl.
　　*H04L 1/1812*　　(2023.01)
　　*H04W 72/23*　　(2023.01)

(58) Field of Classification Search
　　CPC ... H04L 5/0044; H04L 5/0055; H04L 5/0096;
　　　　　　　　　　　　　　H04L 1/1822; H04L 1/1864
　　See application file for complete search history.

(56) References Cited

FOREIGN PATENT DOCUMENTS

| CN | 105451211 A | 3/2016 |
|---|---|---|
| CN | 107079437 A | 8/2017 |
| CN | 107371182 A | 11/2017 |
| CN | 107431581 A | 12/2017 |
| CN | 108810976 A | 11/2018 |
| CN | 109217989 A | 1/2019 |
| CN | 109565853 A | 4/2019 |
| WO | 2018145296 A1 | 8/2018 |
| WO | 2019019184 A1 | 1/2019 |
| WO | 2019027304 A1 | 2/2019 |

OTHER PUBLICATIONS

"Configured grant retransmission timer", R2-1907056, Source: MediaTek Inc., 3GPP TSG-RAN WG2 Meeting #106 Reno, USA, May 13-17, 2019, 3 pages.
"Configured Grants in NR-U", R2-1907638, Source: Samsung, 3GPP TSG-RAN WG2 Meeting #106 Reno, USA, May 13-17, 2019, 3 pages.
3GPP TR 38.889 V1.1.0 (Dec. 2018); Technical Specification Group Radio Access Network; Study on NR-based Access to Unlicensed Spectrum (Release 16), 119 pages.
International Search Report issued in corresponding International Application No. PCT/CN2019/099871, mailed Apr. 24, 2020, 35 pages.
Written Opinion of the International Searching Authority issued in corresponding International Application No. PCT/CN2019/099871, mailed Apr. 24, 2020, 6 pages.
"Considerations on configured grant for NR-U", Agenda Item: 7.2.2.4.4, Source: Oppo, 3GPP TSG RAN WG1 Meeting #94bis R1-1810961, Chengdu, China, Oct. 8-12, 2018, 4 pages.
"New WID on NR-based Access to Unlicensed Spectrum", Agenda Item: 9.1.1, Source: Qualcomm Inc., 3GPP TSG RAN Meeting #82 RP-182878, Sorrento, Italy, Dec. 10-13, 2018, 8 pages.
International Search Report issued in corresponding International Application No. PCT/CN2019/120399, mailed Mar. 24, 2020, 48 pages.
Written Opinion of the International Searching Authority issued in corresponding International Application No. PCT/CN2019/120399, mailed Mar. 24, 2020, 9 pages.
International Search Report issued in corresponding International Application No. PCT/CN2019/095684, mailed Apr. 16, 2020, 45 pages.
Written Opinion of the International Searching Authority issued in corresponding International Application No. PCT/CN2019/095684, mailed Apr. 16, 2020, 9 pages.
"Discussion on sidelink resource allocation mode 1", Agenda Item: 7.2.4.2.1, Source: Huawei, HiSilicon, 3GPP TSG RAN WG1 Meeting #97 R1-1906010, Reno, USA, May 13, 17, 2019, 9 pages.
"On Mode 1 resource allocation in Nr V2X", Agenda Item: 7.2.4.2.1, Source: CATT, 3GPP TSG RAN WG1 Meeting #97 R1-1906315, Reno, USA, May 13-17, 2019, 4 pages.
"Mode 1 resource allocation for NR SL", Agenda Item: 7.2.4.2.1, Source: Oppo, 3GPP TSG RAN WG1 #97 R1-1906473, Reno, USA, May 13-17, 2019, 7 pages.
"Design aspects for NR V2X sidelink communication in resource allocation Mode-1", Agenda item: 7.2.4.2.1, Source: Intel Corporation, 3GPP TSG RAN WG1 Meeting #97 R1-1906795, Reno, USA, May 13-17, 2019, 9 pages.
"On Resource Allocation for NR V2X Mode 1", Agenda item: 7.2.4.2.1, Source: Samsung, 3GPP TSG RAN WG1 #97 R1-1906935, Reno, USA, May 13-17, 2019, 8 pages.
"Discussion on resource allocation for NR sidelink Mode 1", Agenda item: 7.2.4. 2.1, Source : LG Electronics, 3GPP TSG RAN WG1 #97 Meeting R1-1907013, Reno, May 13-17, 2019, 5 pages.
"Uu based sidelink resource allocation", Agenda Item: 7.2.4.2.1, Source: Ericsson, 3GPP TSG RAN WG1 Meeting #9 7, R1-1907135, Reno, US , May 13-17, 2019, 8 pages.
"Mode 1 Resource allocation for NR-V2X", Agenda item: 7.2.4.2.1, Source: Qualcomm Incorporated, 3GPP TSG RAN WG1 Meeting #97 R1-1907270, Reno, USA, May 13-17, 2019, 3 pages.
First Office Action issued in corresponding European Application No. 19940815.4, mailed Oct. 18, 2023.

* cited by examiner

DATA TRANSMISSION METHOD, TERMINAL DEVICE AND STORAGE MEDIUM

CROSS-REFERENCE TO RELATED APPLICATION

This application is a continuation application of PCT Patent Application No. PCT/CN2019/099871, entitled "DATA TRANSMISSION METHOD, TERMINAL DEVICE AND STORAGE MEDIUM" filed on Aug. 8, 2019, the disclosure of which is incorporated herein by reference in its entirety.

TECHNICAL FIELD

The present disclosure relates to mobile communication technologies, and in particular to a data transmission method, terminal device and storage medium.

BACKGROUND

The 3GPP RAN work group agreed to the establishment of a New Radio (NR) unlicensed operating method in December 2018. A goal of this project is to make NR operate in unlicensed bands. For a configured grant (CG) resource configured in the unlicensed band of NR, when it is determined that a network device receives data that has been sent, the CG resource can be used to transmit new data, that is, initiating a new transmission; when it is determined that the network device does not successfully receive the data that has been sent, the CG resource can be used to retransmit the sent data, that is, initiating a retransmission.

SUMMARY

Embodiments of the present disclosure provide a data transmission method, a terminal device, and a storage medium, which can balance initiation of a new transmission and initiation of a retransmission.

In a first aspect, the embodiments of the present disclosure provide a data transmission method, including:

determining, by a terminal device, according to states of a first timer and a second timer corresponding to a hybrid automatic repeat request (HARQ) process, whether the HARQ process corresponding to a first configured grant resource is available for transmitting data to be transmitted; and performing, by the terminal device, no new transmission on the HARQ process during running period of the first timer, and performing, by the terminal device, no retransmission on the HARQ process during running period of the second timer.

In a second aspect, the embodiments of the present disclosure provide a terminal device, including: a determining unit configured to determine, according to states of a first timer and a second timer corresponding to a HARQ process, whether the HARQ process corresponding to a first configured grant resource is available for transmitting data to be transmitted; and no new transmission is performed by the terminal device on the HARQ process during running period of the first timer, and no retransmission is performed by the terminal device on the HARQ process during running period of the second timer.

In a third aspect, the embodiments of the present disclosure provide a terminal device, including a processor and a memory configured to store a computer program that can be run on the processor, wherein the processor is configured to carry out steps of the above data transmission method when running the computer program.

In a fourth aspect, the embodiments of the present disclosure provide a storage medium storing an executable program which, when being executed by a processor, carries out the above data transmission method.

DETAILED DESCRIPTION

In order to have a more detailed understanding of features and technical content of embodiments of the present disclosure, implementations of the embodiments of the present disclosure will be described in detail below with reference to accompanying drawings. The accompanying drawings are for reference only and are not intended to limit the embodiments of the present disclosure.

Before detailed description of a data transmission method provided by the embodiments of the present disclosure, a CG resource, a CG timer, and a CG retransmission timer are briefly described, respectively.

Here, the unlicensed band in which NR operates is called a NR in Unlicensed (NR-U) spectrum. NR-U can include the following scenarios:

Scenario A: a carrier aggregation scenario, where a primary cell (PCell) operates in a licensed spectrum, aggregates a secondary cell (SCell) operating on an unlicensed spectrum through a carrier aggregation method.

Scenario B: a dual-connection operating scenario, where the PCell operates in a LTE licensed spectrum, and the PScell operates in the NR-U spectrum.

Scenario C: an independent operating scenario, where NR operates on the unlicensed spectrum as an independent cell.

Scenario D: a NR single cell scenario, where an uplink (UL) operates on the licensed spectrum, and a downlink (DL) operates on the unlicensed spectrum.

Scenario E: a dual-connection operating scenario, where the PCell operates in a NR licensed spectrum, and a primary secondary cell (PScell) operates in the NR unlicensed spectrum.

Operating bands of NR-U can be a 5 GHz unlicensed spectrum and a 6 GHz unlicensed spectrum. On the unlicensed spectrums, a design of NR-U should ensure fairness with other systems, such as Wi-Fi, that have already operated on these unlicensed spectrums. A principle of fairness is that an impact of NR-U on the systems (such as Wi-Fi) that have been deployed on the unlicensed spectrum cannot exceed an impact between these systems.

In order to ensure fair coexistence of systems on the unlicensed spectrum, energy detection has been agreed as a basic coexistence mechanism. A general energy detection mechanism is a Listen before talk (LBT) mechanism, and a basic principle of the LBT mechanism is: before a base station or a terminal (a transmission end) transmits data on the unlicensed spectrum, it needs to listen for a time period according to specifications. If a listening result indicates that a channel is idle, the transmission end can transmit the data to a reception end. If the listening result indicates that the channel is occupied, the transmission end needs to back off for a time period according to specifications and then continue to listen to the channel until the listening result for the channel indicates idle before transmitting the data to the reception end.

At present, four channel access categories are defined in NR-U:

Category 1, a direct transmission category:

this category is used in a transport (TX) side for swift transmission after a switching gap in COT of a continuity signal;

the switching gap refers to switching time for receiving transmission, and a typical value is no more than 16 us.

Category 2, a LBT category without random back-off:

this category means that the time for the UE to listen to the channel is determined, which is generally short, such as 25 us.

Category 3, a LBT category with random back-off (fixed contention window):

in a LBT process, the TX side randomly selects a random value in the contention window to determine the time to listen to the channel.

Category 4, a LBT category with random back-off (unfixed contention window):

in the LBT process, the TX side randomly selects a random value in the contention window to determine the time to listen to the channel, and the contention window is variable.

For the category 4, there are channel access priority classes as shown in table 1.

TABLE 1

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} | where $m_p$ relates to the channel listening time for performing channel access. Specifically, the base station needs to perform channel listening for a time period of Td first, where Td=16 us+$m_p$×9 us. $CW_{min,p}$ and $CW_{max,p}$ relate to the random channel listening time during the channel access. Specifically, when the base station performs listening for Td time and the channel is idle, it needs to listen to the channel again N times, each time with a duration of 9 us, where N is a random number from 0 to $CW_p$, and $CW_{min,p} \leq CW_p \leq CW_{max,p}$. $T_{mcot,p}$ is a maximum channel occupying time for the base station after preempting the channel, and relates to a channel priority class adopted by the base station. For example, if the priority class is 1, the channel will be occupied up to at most 2 ms after the channel listening is successful.

In summary, for the terminal, the base station needs to transmit the data to the terminal within the MCOT time. If the base station does not preempt the channel, that is, outside of the MCOT time, the terminal will not receive scheduled data from the base station.

The NR supports two types of configured grant (CG), a first type of CG and a second type of CG.

For the first type of CG, an uplink grant is provided by radio resource control (RRC) and stored as the configured uplink grant.

For the second type of CG, the uplink grant is provided by a physical downlink control channel (PDCCH), and the configured uplink grant is stored or cleared based on Layer1 signaling indicating configured uplink grant activation or deactivation.

For CG, the network may configure a CG timer in ConfiguredGrantConfig through RRC signaling, and the CG timer is an integer multiple of a period of the configured CG resource.

There are the following starting conditions for the CG timer:

Condition 1: when the UE receives an uplink grant scheduled by a PDCCH scrambled with a cell radio network temporary identifier (C-RNTI), and a HARQ process corresponding to the uplink grant is also configured for the CG at the same time, the UE needs to start or restart the CG timer when receiving the PDCCH, so that during the operation time of the CG timer, even if there is a subsequent CG resource, and a HARQ process corresponding to the CG resource is the same as the HARQ process corresponding to the scheduled grant, data of the subsequent CG will not cover data transmitted through the uplink grant dynamically scheduled by the PDCCH.

Condition 2: when the UE receives the uplink gran scheduled by the PDCCH scrambled with the CS-RNTI, the uplink grant is used to schedule CG to retransmit data.

Condition 3: when new data is transmitted or the data is retransmitted (either on the CG resource or on a dynamically scheduled resource), the CG timer needs to be started or restarted.

A main purpose of the CG timer is to prevent the data transmitted by the CG resource corresponding to a certain HARQ process from covering the data transmitted by the uplink resource of the same HARQ process (the uplink resource can be CG, dynamically scheduled grant) during the period of the timer; at the same time, when the CG timer expires, the UE can use the CG resource to transmit the new data, that is, it is considered that the data of the HARQ process corresponding to the CG timer is successfully transmitted.

In the embodiments of the present disclosure, for the CG resource configured on the NR-U, a timer is also introduced, which is called a CG retransmission timer here. Here, by introducing the CG retransmission timer, the following situation can be taken into account: in NR-U, when the UE initiates data transmission on the CG, the UE cannot distinguish whether the network receives the data correctly or not, that is, it cannot distinguish whether the network has received the data correctly or the network has not received the data correctly and thus it needs to schedule retransmission by the UE. In the case that the network receives the data correctly, in the related art, the network does not provide any feedback to the UE. In the case that the network does not receive the data correctly, the network needs to dynamically schedule retransmission of the data. However, in NR-U, it may be possible that the network cannot obtain the channel and thus the dynamic scheduling cannot be sent to the UE. A function of the CG retransmission timer is: when the timer expires, the UE can automatically initiate the retransmission on the CG.

In the NR CG in the related art, the following cases can be prevented from occurring by configuring the CG timer by the network:

Case 1: the data transmitted by the CG resource covers the data transmitted by a dynamic grant (DG) resource with the same HARQ process as the CG resource;

Case 2: the data transmitted by the CG resource covers the data transmitted by other CG resources with the same HARQ process as the CG resource;

Case 3: when the CG timer expires, it implicitly indicates that the data corresponding to the HARQ process has been successfully received by the network, that is, the UE considers it as an ACK.

In NR-U, RAN2 introduces the CG retransmission timer, which functions to enable the UE to automatically initiate the retransmission on the CG resource, that is, when the CG retransmission timer expires, the UE can initiate the retransmission on the CG resource with the corresponding HARQ process. When the channel is occupied, the network cannot send the feedback in time. When the CG retransmission timer expires, the UE will automatically initiate the retransmission on the CG resource.

However, in the above scheme, it does not involve how the terminal device balances between initiating a new transmission and initiating a retransmission.

Based on the above problems, the present disclosure provides a data transmission method. The data transmission method in the embodiments of the present disclosure can be applied to various communication systems, such as a Global System of Mobile (GSM) communication system, a Code Division Multiple Access (CDMA) system, a Wideband Code Division Multiple Access (WCDMA) system, a General Packet Radio Service (GPRS), a Long Term Evolution (LTE) system, a LTE Frequency Division Duplex (FDD) system, a LTE Time Division Duplex (TDD) system, a Universal Mobile Telecommunications System (UMTS), a Worldwide Interoperability for Microwave Access (WiMAX) communication system, a 5G system or the like.

Figure 1:
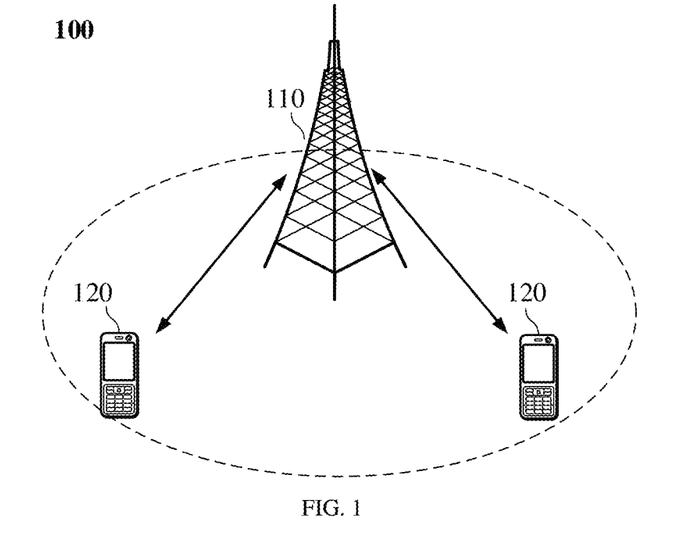
FIG. 1 is a schematic diagram of a composition structure of a communication system according to an embodiment of the present disclosure.

Exemplarily, a communication system 100 to which the embodiments of the present disclosure are applied is as shown in FIG. 1. The communication system 100 may include a network device 110, and the network device 110 may be a device that communicates with a terminal device 120 (or called a communication terminal or a terminal). The network device 110 may provide communication coverage for a specific geographical area, and may communicate with terminal devices located within the coverage area. Optionally, the network device 110 may be a Base Transceiver Station (BTS) in a GSM system or CDMA system, or a NodeB (NB) in a WCDMA system, or an Evolutional Node B (eNB or eNodeB) in an LTE system, or a gNB in the NR/5G system, or a radio controller in a Cloud Radio Access Network (CRAN), or the network device may be a mobile switching center, a relay station, an access point, a vehicle-mounted device, a wearable device, a hub, a switch, a bridge, a router, a network side device in a 5G network, or a network device in a future evolved Public Land Mobile Network (PLMN), etc.

The communication system 100 also includes at least one terminal device 120 located within the coverage area of the network device 110. The "terminal device" as used herein includes, but is not limited to, a device configured to receive/send communication signals via a wired circuit, for example, via a public switched telephone network (PSTN), a digital subscriber line (DSL), a digital cable, a direct cable; and/or via another data connection/network; and/or via a wireless interface, for instance, for a cellular network, a wireless local area network (WLAN), a digital television network such as a digital video broadcasting-handheld (DVB-H) network, a satellite network, and an amplitude modulation-frequency modulation (AM-FM) broadcast transmitter; and/or another terminal device; and/or an Internet of Things (IoT) device. A terminal device configured to communicate via a wireless interface may be referred to as "a wireless communication terminal", "a wireless terminal" or "a mobile terminal". Examples of the mobile terminal include, but not limited to, a satellite or cellular telephone; a personal communication system (PCS) terminal capable of combining a cellular wireless telephone with data processing, facsimile, and data communication abilities; a personal digital assistant (PDA) that may include a radio telephone, a pager, internet/intranet access, a Web browser, a memo pad, a calendar, a Global Positioning System (GPS) receiver; and a conventional laptop and/or palmtop receiver or other electronic devices including a radio telephone transceiver. The terminal device may refer to an access terminal, user equipment (UE), a subscriber unit, a subscriber station, a mobile station, a rover station, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device, or other processing devices connected to a wireless modem, a vehicle-mounted device, a wearable device, a terminal device in a 5G network, or a terminal device in a future evolved Public Land Mobile Network (PLMN), or the like.

Optionally, a device to device (D2D) communication may be performed between the terminal devices 120.

Optionally, a 5G system or a 5G network may also be referred to as an NR system or an NR network.

FIG. 1 schematically illustrates one network device and two terminal devices. Optionally, the wireless communication system 100 may include multiple network devices, and other numbers of terminal devices may be included within the coverage area of each network device, which is not limited in the embodiments of the present disclosure.

Optionally, the communication system 100 may also include other network entities, such as a network controller and a mobile management entity, which is not limited in the embodiments of the present disclosure.

It should be understood that a device with a communication function in a network/system in the embodiments of the present disclosure may be referred to as a communication device. Taking the communication system 100 shown in FIG. 1 as an example, the communication device may include a network device 110 and a terminal device 120 which have communication functions, and the network device 110 and the terminal device 120 may be the specific devices described above, and will not be repeated herein.

The communication device may also include other devices in the communication system 100, such as other network entities, for example, a network controller and a mobile management entity, which is not limited in the embodiments of the present disclosure.

Figure 2:
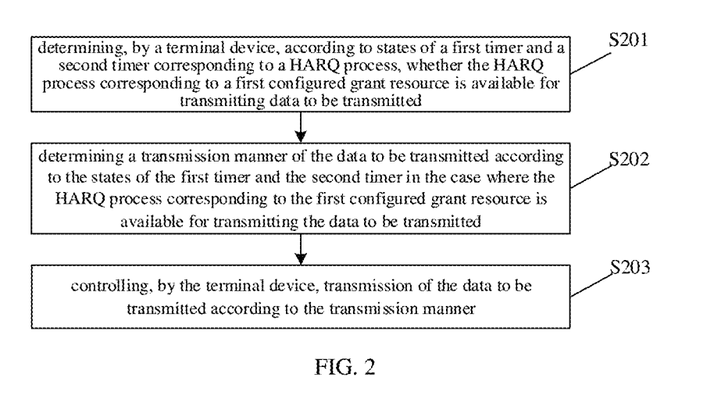
FIG. 2 is a schematic diagram of an optional processing flow of a data transmission method provided by an embodiment of the present disclosure.

An optional processing flow of the data transmission method provided by the embodiments of the present disclosure, as shown in FIG. 2, includes the following steps.

In step S201, the terminal device determines whether a HARQ process corresponding to a first configured grant resource is available for transmitting data to be transmitted according to a state of a first timer and a state of a second timer corresponding to the HARQ process.

In the embodiments of the present disclosure, the HARQ process corresponding to the first configured grant resource is the same as the HARQ process corresponding to the first timer and the second timer.

The terminal device determines the states of the first timer and the second timer corresponding to the HARQ process, so as to determine whether the HARQ process corresponding to the CG resource is available for data transmission. The timer includes the first timer and the second timer. Exemplarily, when determining whether to perform the new transmission or the retransmission of data on the CG resource, the terminal device determines the HARQ process used by the CG resource, determines the states of the first timer and the second timer corresponding to the HARQ process, and determine whether to perform the new transmission or the retransmission of data on the HARQ process according to the determined states of the first timer and the second timer.

The CG resource is a periodic resource, and the CG resource can be configured with at least one HARQ process. A CG resource of one period corresponds to one HARQ process, and CG resources of different periods can correspond to the same HARQ process. Each HARQ process corresponds to the first timer and the second timer. Here, the HARQ process corresponding to the first timer and the second timer and the HARQ process corresponding to the first CG resource are the same HARQ process, and the first CG resource is any periodic resource among the CG resources.

Exemplarily, one CG resource is configured with one HARQ process, and a HARQ process corresponding to the CG resource at each period point is the same HARQ process. For example, if the HARQ process configured for the CG resource is HARQ process #1, the HARQ process corresponding to the CG resource at each period point is HARQ process #1 until the CG resource is deactivated.

In the embodiments of the present disclosure, the terminal device can determine the HARQ process associated with a certain CG resource according to a rule agreed upon by the terminal device and the network device. The terminal device can also determine the HARQ process used by a certain CG resource by itself, and transmit data together with uplink control information, where a process number of the HARQ process used by this resource is indicated in the uplink control information. The HARQ process corresponding to the CG resource is a HARQ process associated with the CG resource or a HARQ process adopted by the CG resource.

Figure 3:
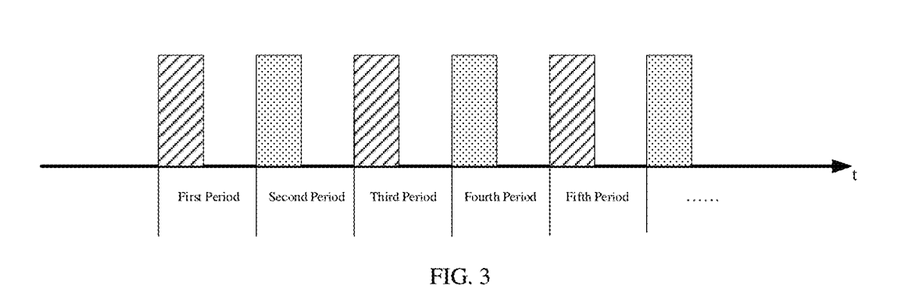
FIG. 3 is a schematic diagram of an optional periodic CG resource provided by an embodiment of the present disclosure.

Exemplarily, one CG resource is configured with at least two HARQ processes, and then the HARQ processes associated with the CG resource at different period points may be different. For example, the HARQ process configured for the CG resource includes HARQ process #1 and HARQ process #2, the HARQ process associated with the CG resource at a point of a first period can be HARQ process #1, and the HARQ process associated with the CG resource at a point of a second period can be HARQ process #2, the HARQ process associated with the CG resource at a point of a third period can be HARQ process #1, and the HARQ process associated with the CG resource at a point of a fourth period can be HARQ process #2. As shown in FIG. 3, CG resources represented by shaded areas filled with diagonal lines are CG resources corresponding to a same HARQ process, and correspond to same timers; CG resources represented by shaded areas filled with dots are CG resources corresponding to a same HARQ process, and correspond to same timers. The CG resource at the first period point and the CG resource at the second period point correspond to the same timers: a first timer A1 and a second timer B1, and the CG resource at the second period point and the CG resource at the second period point correspond to the same timers: a first timer A2 and a second timer B2, the terminal device determines whether to transmit the data on the CG resource at the first period point or the CG resource at the third period point according to the state of the first timer A1 and the state of the second timer B1, and the terminal device determines whether to transmit the data on the CG resource at the second period point or the CG resource at the fourth period point according to the state of the first timer A2 and the state of the second timer B2.

During running period of the first timer, the terminal device does not perform new transmission on the HARQ process corresponding to the first timer, that is, cannot transmit new data. The first timer may be a CG timer.

During running period of the second timer, the terminal device does not perform retransmission on the HARQ process corresponding to the second timer, that is, cannot transmit retransmitted data. The second timer may be a CG retransmission timer.

It should be noted that the new transmission in the embodiments of the present disclosure refers to that the data transmitted by the CG resource corresponding to the HARQ process comes from data generated in a MAC layer multiplexing and assembly entity. When the terminal performs the new transmission, the transmitted data is called the new data. The retransmission refers to that the data transmitted by the CG resource corresponding to the HARQ process comes from data saved in a HARQ buffer corresponding to the HARQ process. When the terminal performs the retransmission, the transmitted data is called the retransmitted data. Different data can be different transmission blocks (TB).

For example, for the CG resources using the same HARQ, data TB1 is transmitted at first to fifth period points, data TB2 is transmitted at sixth to seventh period points, and data TB3 is transmitted at eighth to tenth period points; when TB1 is the first data, the data TB1 transmitted at the second to the fifth period points is the retransmitted data with respect to the data TB1 transmitted at the first period point, and the data TB2 transmitted at the sixth period point is the new data with respect to the data TB1 transmitted at the fifth period point; the data TB2 transmitted at the seventh period point is the retransmitted data with respect to the data TB2 transmitted at the sixth period point, and the data TB3 transmitted at the eighth period point is the new data with respect to the data TB2 transmitted at the seventh period point.

The network device may send configured timer parameters of the first timer and second timer to the terminal device through an RRC message, and the terminal device maintains the first timer and the second timer according to the received timer parameters. The timer parameter here refers to a timer duration, and the first timer and the second timer are configured for the terminal device together with a CG resource configuration parameter.

In the embodiments of the present disclosure, a duration of the first timer is greater than a duration of the second timer. Optionally, the duration of the first timer may be an integer multiple of the duration of the second timer. For example, the duration of the first timer is 6 CG resource periods. For another example, the duration of the second timer is 2 CG resource periods.

In the embodiments of the present disclosure, when the terminal device determines that the HARQ process corresponding to the first configured grant resource can be used for new transmission, the terminal device starts the first timer and the second timer.

Optionally, the terminal device performs LBT, and determines based on the performed LBT that there is currently an idle channel, that is, when the LBT is successful, if the first timer and the second timer are not running, it is determined that the HARQ process corresponding to the first timer and the second timer is available for transmitting data and the first timer and the second timer are started.

In the embodiments of the present disclosure, determining whether the HARQ process is available for transmitting the data to be transmitted includes either of the following two cases:

Case 1: in a case where the state of the first timer is running and the state of the second timer is running, the HARQ process corresponding to the first timer and the second timer does not perform the transmission of the data to be transmitted.

Case 2: in a case where the state of the first timer is stopped or the state of the second timer is stopped, the HARQ process corresponding to the first configured grant resource is available for transmitting the data to be transmitted.

In step S202, in a case where the HARQ process corresponding to the first configured grant resource is available for transmitting the data to be transmitted, the terminal device determines a transmission manner of the data to be transmitted according to the state of the first timer and the state of the second timer.

The transmission manner includes: the new transmission and the retransmission. If the transmission manner is the new transmission, the data to be transmitted is the new data; if the transmission manner is the retransmission, the data to be transmitted is the retransmitted data.

Optionally, the determining the transmission manner of the data to be transmitted according to the state of the first timer and the state of the second timer includes: in a case where the state of the first timer is stopped and the state of the second timer is stopped, the transmission manner is the new transmission; or in a case where the state of the first timer is running and the state of the second timer is stopped, the transmission manner is the retransmission.

When the data to be transmitted is the new data, in a case where the state of the first timer is stopped, and the state of the second timer is stopped, the HARQ process can be used to transmit the data; and in a case where the state of the first timer is running or the state of the second timer is running, the HARQ process cannot be used to transmit the data.

In an example where the duration of the first timer is greater than the duration of the second timer, the state of the first timer being running or the state of the second timer being running includes the following two operation scenarios:

Operation scenario A1: the state of the first timer is running, and the state of the second timer is stopped.

Operation scenario A2: the state of the first timer is running, and the state of the second timer is running.

When the terminal device prepares to initiate the transmission of new data on the CG resource:

a. the terminal device determines whether the CG timer corresponding to the HARQ process corresponding to the current CG resource is running or not. If it is not running, the UE can initiate the transmission of new data on the CG resource;

b. when the terminal device determines that the new data can be transmitted on the CG resource (that is, the LBT is successful), the terminal device starts/restarts the CG timer and CG retransmission timer.

When the data to be transmitted is the retransmitted data, in a case where the state of the first timer is running, and the state of the second timer is stopped, the HARQ process can be used to transmit the data; and in a case where the state of the first timer is stopped or the state of the second timer is running, the HARQ process cannot be used to transmit the data.

In an example where the duration of the first timer is greater than the duration of the second timer, in a case of transmitting the retransmitted data, the state of the first timer being stopped or the state of the second timer being running includes the following two operation scenarios:

Operation scenario B1: the state of the first timer is stopped, and the state of the second timer is stopped.

Operation scenario B2: the state of the first timer is running, and the state of the second timer is running.

When the terminal device prepares to initiate the transmission of retransmitted data on the CG resource:

a. the terminal device determines whether the CG retransmission timer corresponding to the HARQ process corresponding to the current CG resource is running or not. If it is not running, the UE can initiate the transmission of retransmitted data on the CG resource; if the CG timer corresponding to the HARQ process corresponding to the current CG resource is running, it does not affect the determination of whether the HARQ process can be used to retransmit the data on the CG resource. That is, the CG timer only prohibits the new transmissions on the CG resources with the same HARQ process, and the CG retransmission timer only prohibits the retransmissions on CG resources with the same HARQ process.

b. When the terminal device determines that the retransmitted data can be transmitted on the CG resource (that is, the LBT is successful), the UE starts/restarts the CG retransmission timer; the retransmission on the CG resource will not affect the CG timer.

In step S203, the terminal device controls the transmission of the data to be transmitted according to the transmission manner.

In the embodiments of the present disclosure, after determining the transmission manner, the terminal device performs the transmission of the data to be transmitted according to the determined transmission manner. In an example, in a case where the transmission manner is the new transmission, the terminal device performs the transmission of new data through the HARQ process corresponding to the first CG resource. In another example, in a case where the transmission manner is the retransmission, the terminal device performs the transmission of retransmitted data through the HARQ process corresponding to the first CG resource.

In the embodiments of the present disclosure, different HARQ processes correspond to different HARQ buffers and HARQ operators. For a HARQ process, the new data transmitted by the terminal device comes from the data generated in the MAC layer multiplexing and assembly entity; the retransmitted data transmitted by the terminal device comes from the data saved in the HARQ buffer corresponding to the HARQ process.

Optionally, in a case where the transmission manner is the retransmission, the terminal device restarts the second timer after transmitting the retransmitted data.

In the embodiments of the present disclosure, before or after the terminal device executes the step S201, the method further includes:

receiving, by the terminal device, a transmission feedback for the transmitted data of the HARQ process sent by the network device during the running period of the first timer and the second timer; and controlling, by the terminal device, the state of the first timer and the state of the second timer according to the transmission feedback.

Here, the transmission feedback for the transmitted data may be a downlink feedback indication (DFI) showing the feedback of a state of the first data received by the network device, that is, the network device notifies the terminal device through the DFI whether the transmitted data is correctly received. The DFI can include ACK or NACK. Here, ACK is called a first feedback, which indicates that the network device successfully receives the transmitted data; and NACK is called a second feedback, which indicates that the network device has not successfully received the transmitted data.

Optionally, the controlling, by the terminal device, the state of the first timer and the state of the second timer according to the transmission feedback includes: stopping running of the first timer and stopping running of the second timer in a case where the transmission feedback is the first feedback; or stopping running of the second timer in a case where the transmission feedback is the second feedback.

For the first timer, in a case where the terminal device receives the transmission feedback for the transmitted data of the HARQ process, and the transmission feedback is the first feedback, the network device has indicated to the terminal device that the transmitted data is successfully received. At this time, the first timer corresponding to the HARQ of the CG resource that transmits the transmitted data is stopped, indicating the transmission of new data can be initiated, so as to avoid the situation where the new data cannot be transmitted. In a case where the terminal device receives the transmission feedback for the transmitted data, and the transmission feedback is the second feedback, the network device has indicated to the terminal device that the transmitted data is not successfully received. At this time, if the first timer corresponding to the HARQ of the CG resource that transmits the transmitted data is running, the first timer continues to run. Here, through the continuous running of the first timer, the restart of the first timer, resulting in unlimited retransmission by the terminal device, can be prevented.

For the second timer, when the terminal device receives the transmission feedback for the transmitted data of the HARQ process, the network device has indicated to the terminal device whether the transmitted data is received correctly, and it is not required to trigger the automatic retransmission of the UE on the CG through the continuous running of the second timer, the second timer corresponding to the HARQ of the CG resource that transmits the transmitted data needs to be stopped.

Optionally, the data to be transmitted is non-retransmitted data in the case where the transmission feedback is the first feedback; or the data to be transmitted is retransmitted data in the case where the transmission feedback is the second feedback.

In a case where the transmission feedback indicates that the network device successfully receives the transmitted data, the terminal device prepares to initiate the transmission of non-retransmitted data, that is, the new data. In a case where the transmission feedback indicates that the network device has not successfully received the transmitted data, the terminal device prepares to initiate retransmission of the transmitted data.

Optionally, the terminal device sets a feedback variable corresponding to the HARQ process according to the transmission feedback. Here, the terminal device may maintain different feedback variables for different HARQ processes, and control the feedback variables corresponding to the corresponding HARQ processes according to the transmission feedback for the data transmitted through different HARQ processes fed back by the network device.

Optionally, setting the feedback variable corresponding to the HARQ process according to the transmission feedback includes: setting the feedback variable to a first value in a case where the transmission feedback is a first feedback, where the first feedback indicates that the transmitted data is successfully received by the network device; or setting the feedback variable to a second value in a case where the transmission feedback is a second feedback, where the second feedback indicates that the transmitted data is not successfully received by the network device.

Here, the terminal device sets the feedback variable to different values according to different transmission feedback received, so as to indicate the state of receiving the transmitted data by the network through the different values.

In the embodiments of the present disclosure, the feedback variable indicates that data stored in a buffer corresponding to the HARQ process is prohibited from being replaced in a case where the feedback variable is the second value.

In the embodiments of the present disclosure, the terminal device performs different processing according to different DFIs received.

When the DFI indicates ACK, the following processing is performed:
  a. if the CG timer is running, the terminal device stops the CG timer;
  b. if the CG retransmission timer is running, the terminal device stops the CG retransmission timer;
  c. the terminal device can maintain a feedback variable for the HARQ process, and set the feedback variable as ACK.

When the DFI indicates NACK, the following processing is performed:
  a. if the CG timer is running, the CG timer continues to run (without being affected). When the CG timer continues to run, restarting of the CG timer, resulting in unlimited retransmission by the UE, can be prevented;
  b. if the CG retransmission timer is running, the UE stops the CG retransmission timer;
  c. the terminal device can maintain a feedback variable for the HARQ process, and set the feedback variable as ACK.

The impact of DFI on the first timer, the CG timer, and the second timer, the CG retransmission timer, may be as shown in table 2.

TABLE 2

|  | DFI = ACK | DFI = NACK |
| --- | --- | --- |
| CG timer | Stop | No impact |
| CG retransmission timer | Stop | Stop |

In the embodiments of the present disclosure, the terminal device may receive downlink control information (DCI) sent by the network device for scheduling a second configured grant resource; and in response to the DCI, the terminal device starts or restarts the first timer, and stops the second timer.

Here, a HARQ process corresponding to the second configured grant resource and a HARQ process corresponding to the first configured grant resource may be different HARQ processes.

The network device implicitly indicates whether the network device successfully receives first data through the DCI that schedules the second configured grant resource. The terminal device may indicate through the DCI to perform the retransmission or the new transmission by means of the second configured grant resource. Optionally, the terminal device indicates through the DCI to perform the retransmission by means of the second configured grant resource, that is, implicitly indicates that the first data is successfully received through the first configured grant resource. Optionally, the terminal device indicates through the DCI to perform the new transmission by means of the second configured grant resource, that is, implicitly indicates that the first data is not successfully received through the first configured grant resource.

Optionally, the DCI for scheduling the retransmission is received through the CS-RNTI PDCCH, and the DCI for scheduling the new transmission is received through the C-RNTI PDCCH.

Optionally, the terminal device transmits data indicated by the DCI based on the second configured grant resource. Optionally, the data indicated by the DCI is the retransmitted data in a case where the DCI indicates the retransmission; optionally, the data indicated by the DCI is the non-retransmitted data in a case where the DCI indicates new transmission of second data.

In an example, in a case where the terminal device indicates through the DCI to perform the retransmission by means of the second configured grant resource, the terminal device performs the retransmission through the second configured grant resource. In another example, in a case where the terminal device indicates through the DCI to perform the new transmission by means of the second configured grant resource, the terminal device performs the new transmission through the second configured grant resource.

In the embodiments of the present disclosure, when the UE receives the dynamic scheduling (that is, DCI), and the dynamic scheduling schedules the new data transmission/data retransmission of the HARQ process:
 a. if the CG timer is running, the UE starts/restarts the CG timer; and
 b. if the CG retransmission timer is running, the UE stops the CG retransmission timer.

The impact of DCI on the first timer, the CG timer, and the second timer, the CG retransmission timer, can be as shown in table 3.

TABLE 3

|  | DCI = ACK | DCI = NACK |
| --- | --- | --- |
| CG timer | Start/Re-start | Start/Restart |
| CG retransmission timer | Stop | Stop |

In the embodiments of the present disclosure, the terminal device controls the initiation of the new data transmission on the CG resource of the HARQ through the first timer, and controls the initiation of the data retransmission on the CG resource through the second timer, and determines whether to initiate the data to be transmitted before transmitting the data to be transmitted, so as to balance between the initiation of the new transmission and the initiation of the retransmission, improving resource utilization while ensuring that the data is successfully received by the network.

In the following, the data transmission method provided in the embodiments of the present disclosure will be exemplarily described through different scenarios in an example where the HARQ process configured for the CG resource is one process. In practical applications, there is no limitation on the number of HARQ processes configured for the CG resource.

Here, the number of HARQ processes configured by the network device for the CG resource is one, that is, there is only one HARQ process, and HARQ process #0 is used for CG resources at all period points. A period T2 of the CG retransmission timer corresponding to HARQ process #0, timer A, is two periods T1 of the CG resource, and a period T3 of the CG timer, timer B, is six periods T1 of the CG resource.

In the practical applications, the period of the CG timer is greater than the period of the CG retransmission timer, and there is no limitation on values of the periods of the CG timer and the CG retransmission timer.

Scenario 1: UE does not Receive the Feedback

Figure 4:
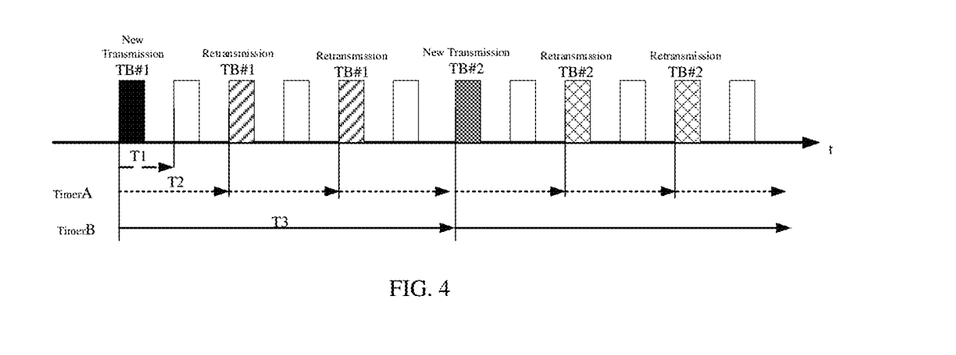
FIG. 4 is a schematic diagram of an optional data transmission effect provided by an embodiment of the present disclosure.

In the scenario 1 where the UE does not receive the feedback including the DFI or DCI, the transmission of the data along time t is as shown in FIG. 4:

when the UE needs to transmit the new data (that is, TB #1) on the CG resource of the first period, the UE first confirms whether there is a CG timer running. If not, the UE can transmit the new data TB #1, that is, performs the new transmission of TB #1, on the CG resource; when it is determined that the HARQ process can be used for data transmission, that is, when the LBT is successful, the UE starts the CG timer, timer B, and the second timer CG retransmission timer, timing A, and the new transmission of TB #1 is transmitted.

At a time point of the CG resource of a second period:
 a. the UE determines that the CG retransmission timer is running, and the UE cannot initiate the retransmission of TB #1;
 b. the UE determines that the CG timer is running, and the UE cannot initiate the transmission of new data.

At a time point of the CG resource of a third period:
 a. the UE determines that the CG retransmission timer is not running and the CG timer is running, the UE can initiate the retransmission of TB #1, that is, transmitting the retransmitted TB #1; and restart the CG retransmission timer.

When the UE has not received the feedback information (including DFI or DCI) from the base station within the period of the CG timer, the UE considers that the data in the HARQ process has been successfully received by the base station; then on the CG resource of the seventh period, the UE can initiate transmission of new data TB #2, that is, the new transmission of TB #2, and start the CG timer and CG retransmission timer at the same time.

At a time point of the CG resource of an eighth period:

a. the UE determines that the CG retransmission timer is running, and the UE cannot initiate the retransmission of TB #2;

b. the UE determines that the CG timer is running, and the UE cannot initiate the transmission of new data.

At a time point of the CG resource of a ninth period:

a. the UE determines that the CG retransmission timer is not running and the CG timer is running, the UE can initiate the retransmission of TB #2, that is, transmitting the retransmitted TB #2, and restart the CG retransmission timer.

In the scenario 1, the CG timer and the CG retransmission timer are started corresponding to the CG resource of NR-U. On the one hand, for the CG resource and the DG resource that have the same HARQ process, it can prevent the data transmitted by the CG resource from covering the data transmitted by the DG resource. On the other hand, it enables the UE to use the CG resource to perform automatic retransmission when it does not receive any feedback, thereby balancing the first transmission and the automatic retransmission of the new data. In addition, the period of the CG timer is greater than the period of the CG retransmission timer, so that the number of times of automatic retransmissions by the UE can be limited, thereby improving resource utilization.

Scenario 2: UE has Received the DFI and the DFI is ACK

Figure 5:
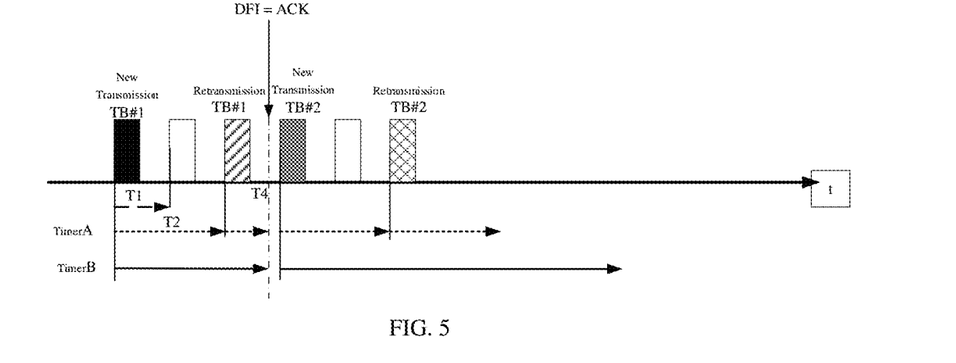
FIG. 5 is a schematic diagram of an optional data transmission effect provided by an embodiment of the present disclosure.

In the scenario 2 where the UE has received the DFI and the DFI is ACK, the transmission of the data along time t is as shown in FIG. 5:

when the UE needs to transmit the new data (that is, TB #1) on the CG resource of the first period, the UE first confirms whether there is a CG timer running. If not, the UE can transmit the new data TB #1, that is, performs the new transmission of TB #1, on the CG resource; when it is determined that the HARQ process can be used for data transmission, that is, when the LBT is successful, the UE starts the CG timer, timer B, and the second timer CG retransmission timer, timing A, and the new transmission of TB #1 is transmitted.

At a time point of the CG resource of the third period, the UE determines that the CG retransmission timer is not running and the CG timer is running, then the UE can initiate the retransmission of TB #1, that is, the transmitted data block is the retransmitted TB #1.

When the UE receives the DFI feedback at a time point T5 within the running time of the CG timer and the CG retransmission timer, and the feedback result is NACK, it indicates that the network has not successfully received TB #1. In this case:

a. the UE stops the CG retransmission timer, the purpose of which is to prevent automatic retransmission of the data that has been received correctly;

b. the UE stops the CG timer, the purpose of which is that the UE can use the CG resources with the same HARQ process to transmit new data.

On the CG resource of the fourth period, neither the CG timer nor the CG retransmission timer is running. In this case, the UE can use the resource to transmit the new data TB #2, and similar to transmitting TB #1, the UE starts the CG timer and CG retransmission timer.

Scenario 3: UE has Received the DFI and the DFI is NACK

Figure 6:
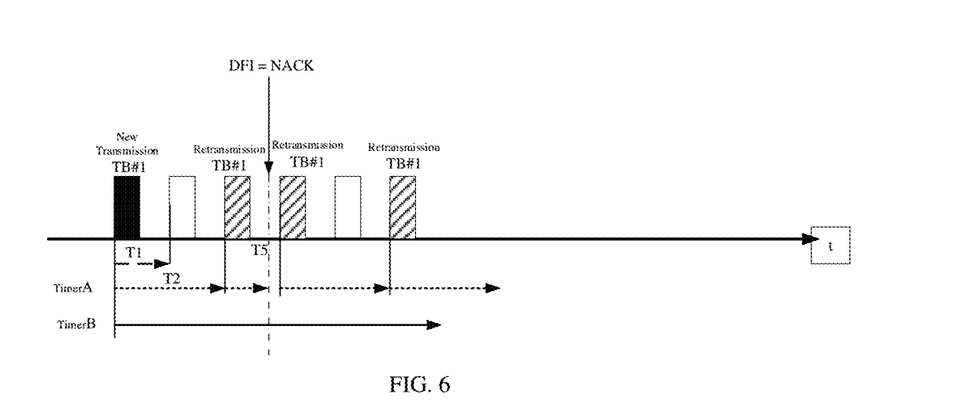
FIG. 6 is a schematic diagram of an optional data transmission effect provided by an embodiment of the present disclosure.

In the scenario 3 where the UE has received the DFI and the DFI is NACK, the transmission of the data along time t is as shown in FIG. 6:

when the UE needs to transmit the new data (that is, TB #1) on the CG resource of the first period, the UE first confirms whether there is a CG timer running. If not, the UE can transmit the new data TB #1, that is, performs the new transmission of TB #1, on the CG resource; when it is determined that the HARQ process can be used for data transmission, that is, when the LBT is successful, the UE starts the CG timer, timer B, and the second timer CG retransmission timer, timing A, and the new transmission of TB #1 is transmitted.

At a time point of the CG resource of the third period, the UE determines that the CG retransmission timer is not running and the CG timer is running, then the UE can initiate the retransmission of TB #1, that is, the transmitted data block is the retransmitted TB #1.

When the UE receives the DFI feedback at a time point T4 within the running time of the CG timer and the CG retransmission timer, and the feedback result is ACK, it indicates that the network has successfully received TB #1. In this case:

a. the UE stops the CG retransmission timer, the purpose of which is to retransmit TB #1 on a next CG resource with the same HARQ process without waiting for the CG retransmission timer to expire;

b. the UE stops the CG timer, the purpose of which is to prevent unlimited automatic retransmission by the UE.

On the CG resource of the fourth period, neither the CG timer nor the CG retransmission timer is running. In this case, the UE can use the resource to transmit the new data TB #2, that is, performs the new transmission of TB #2, and similar to transmitting TB #1, the UE starts the CG timer and CG retransmission timer.

For scenarios that the received DFI is ACK and NACK in scenario 2 and scenario 3, respectively, in the data transmission method provided in the embodiments of the present disclosure, the CG retransmission timer can be stopped, so that the UE initiates the automatic retransmission as early as possible.

Scenario 4: The UE has Received the DCI for Scheduling the Retransmission

Here, the DCI for scheduling the retransmission may be transmitted through the CS-RNTI PDCCH.

Figure 7:
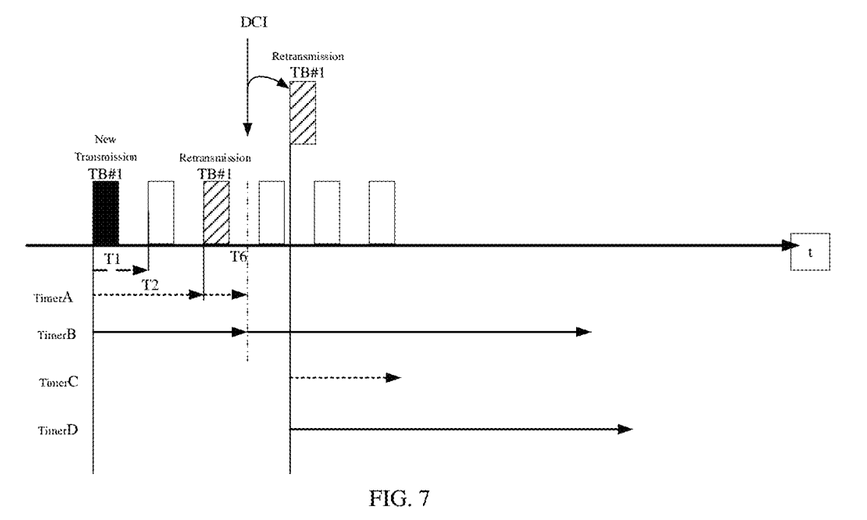
FIG. 7 is a schematic diagram of an optional data transmission effect provided by an embodiment of the present disclosure.

In the scenario 4 where the UE has received the DCI for scheduling the retransmission, the transmission of the data along time t is as shown in FIG. 7:

When the UE needs to transmit new data, that is, TB #1, on the CG resource of the first period, the UE first confirms whether there is a CG timer running. If not, the UE can transmit new data TB #1, that is, performs the new transmission of TB #1, on the CG resource; when it is determined that it can be used for data transmission, that is, when the LBT is successful, the UE starts the CG timer, timer B, and the second timer CG retransmission timer, timing A, and transmits the new transmission of TB #1.

At a time point of the CG resource of the third period, the UE determines that the CG retransmission timer is not running and the CG timer is running, then the UE can initiate the retransmission of TB #1, that is, the transmitted data block is the retransmitted TB #1.

When the UE receives the retransmitted data of TB #1 scheduled by the CS-RNTI PDCCH at a time point T6 within the running time of the CG timer and the CG retransmission timer:

a. the UE stops the CG retransmission timer, the purpose of which is to prevent automatic retransmission on the CG resource and thus covering the retransmission on the dynamically scheduled resource;

b. restart the CG timer to prevent the CG resource from covering the dynamically scheduled resource.

The HARQ process corresponding to the CG resource scheduled by the DCI is HARQ process #1. The CG retransmission timer corresponding to HARQ process #1 is timer C, and the CG timer is timer D. When the UE needs to transmit data on the CG resource of the first period scheduled by the DCI, that is, retransmitting TB #1, the UE first confirms whether there is a CG timer running. If not, the UE can transmit the retransmitted TB #1 on the CG resource scheduled by the DCI; when it is determined that the data can be transmitted, that is, when the LBT is successful, the UE starts the CG timer, timer D, and CG retransmission timer: timing C, corresponding to HARQ process #1, and transmits the retransmitted TB #1.

It should be noted that before a deactivation instruction for the CG resource corresponding to HARQ process #0 is received, its corresponding CG timer, timer B, continues to run until it expiries.

In practical applications, the DCI for scheduling the new transmission can be received through the C-RNTI PDCCH.

For the scenario where the terminal device receives the dynamically scheduled retransmission or new transmission in scenario 4, the UE stops the CG retransmission timer to prevent automatic retransmission on the CG resource from covering the retransmission on the dynamically scheduled resource; and at the same time, the UE restarts the CG timer to prevent the CG resource from covering the dynamically scheduled resource.

Figure 8:
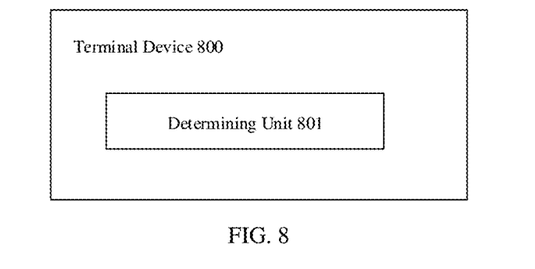
FIG. 8 is a schematic diagram of a composition structure of a terminal device provided by an embodiment of the present disclosure.

In order to implement the aforementioned data transmission method, an embodiment of the present disclosure further provides a terminal device. A composition structure of the terminal device is shown in FIG. 8, and the terminal device 800 includes:

a determining unit 801, configured to determine, according to states of a first timer and a second timer corresponding to a HARQ process, whether the HARQ process corresponding to a first configured grant resource is available for transmitting data to be transmitted, wherein no new transmission is performed by the terminal device on the HARQ process during running period of the first timer, and no retransmission is performed by the terminal device on the HARQ process during running period of the second timer.

In the embodiments of the present disclosure, a duration of the first timer is greater than a duration of the second timer.

In the embodiments of the present disclosure, the terminal device further includes:

a starting unit, configured to start the first timer and the second timer when the terminal device determines that the HARQ process corresponding to the first configured grant resource is available for new transmission.

In the embodiments of the present disclosure, the determining unit 801 is further configured such that:

transmission of the data to be transmitted is not performed by the HARQ process corresponding to the first configured grant resource in a case where the state of the first timer is running and the state of the second timer is running; and the HARQ process corresponding to the first configured grant resource is available for transmitting the data to be transmitted in a case where the state of the first timer is stopped or the state of the second timer is stopped.

In the embodiments of the present disclosure, the determining unit 801 is further configured to:

determine a transmission manner of the data to be transmitted according to the state of the first timer and the state of the second timer in a case where the HARQ process corresponding to the first configured grant resource is available for transmitting the data to be transmitted.

In the embodiments of the present disclosure, the determining unit 801 is further configured such that:

in a case where the state of the first timer is stopped and the state of the second timer is stopped, the transmission manner is new transmission; or in a case where the state of the first timer is running and the state of the second timer is stopped, the transmission manner is retransmission.

In the embodiments of the present disclosure, the terminal device further includes a first transmitting unit, configured to control transmission of the data to be transmitted according to the transmission manner.

In the embodiments of the present disclosure, the terminal device further includes:

a restarting unit, configured to restart the second timer in a case where the transmission type is the retransmission.

In the embodiments of the present disclosure, the terminal device further includes:

a first feedback unit, configured to:

receive transmission feedback for the transmitted data of the HARQ process sent by the network device during the running period of the first timer and the second timer; and control the state of the first timer and the state of the second timer according to the transmission feedback.

In the embodiments of the present disclosure, the first feedback unit is further configured to:

stop running of the first timer and stop running of the second timer in a case where the transmission feedback is first feedback, wherein the first feedback indicates that the transmitted data is successfully received by the network device; or stop running of the second timer in a case where the transmission feedback is second feedback, wherein the second feedback indicates that the transmitted data is not successfully received by the network device.

In the embodiments of the present disclosure, the data to be transmitted is non-retransmitted data in the case where the transmission feedback is the first feedback; or the data to be transmitted is retransmitted data in the case where the transmission feedback is the second feedback.

In the embodiments of the present disclosure, the terminal device further includes:

a setting unit, configured to set a feedback variable corresponding to the HARQ process according to the transmission feedback.

In the embodiments of the present disclosure, the setting unit is further configured to:

set the feedback variable to a first value in a case where the transmission feedback is first feedback, where the first feedback indicates that the transmitted data is successfully received by the network device; or set the feedback variable to a second value different from the first value in a case where the transmission feedback is second feedback, where the second feedback indicates that the transmitted data is not successfully received by the network device.

In the embodiments of the present disclosure, the feedback variable indicates that data stored in a buffer corresponding to the HARQ process is prohibited from being replaced in a case where the feedback variable is the second value.

In the embodiments of the present disclosure, the terminal device further includes a second feedback unit, configured to:

receive downlink control information (DCI), for scheduling a second configured grant resource, sent by the network device; and in response to the DCI, start or restart the first timer, and stop the second timer.

In the embodiments of the present disclosure, the terminal device further includes:

a second transmitting unit, configured to transmit data indicated by the DCI based on the second configured grant resource.

In the embodiments of the present disclosure, the data indicated by the DCI is the retransmitted data in a case where the DCI indicates the retransmission; or the data indicated by the DCI is the non-retransmitted data in a case where the DCI indicates the new transmission.

The embodiments of the present disclosure also provides a terminal device, including a processor and a memory configured to store a computer program that can run on the processor, and the processor is configured to carry out steps of the above-mentioned data transmission method performed by the terminal device when running the computer program.

Figure 9:
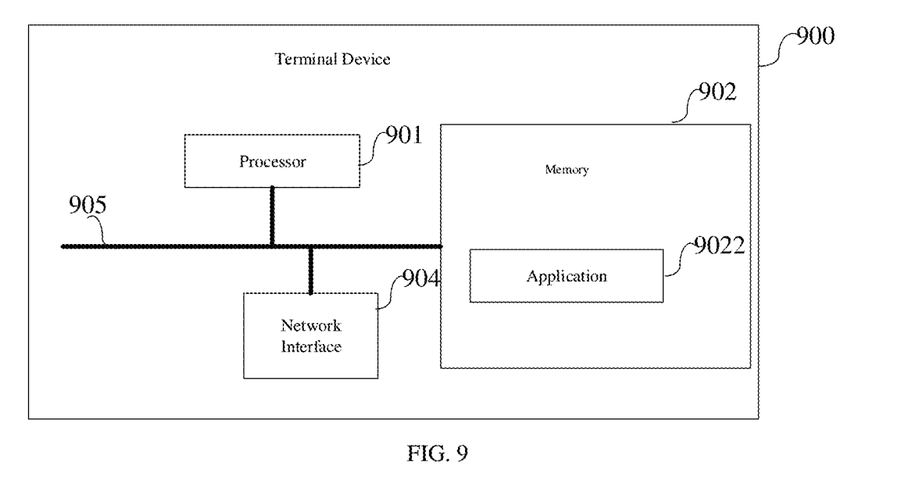
FIG. 9 is a schematic diagram of a hardware composition structure of a terminal device according to an embodiment of the present disclosure.

FIG. 9 is a schematic diagram of a hardware composition structure of a terminal device according to an embodiment of the present disclosure. The terminal device 900 includes: at least one processor 901, a memory 902, and at least one network interface 904. Various components in the electronic device 900 are coupled together by a bus system 905. It may be understood that the bus system 905 is configured to implement connection and communication between these components. In addition to a data bus, the bus system 905 also includes a power bus, a control bus, and a state signal bus. However, for clarity of description, various buses are marked as the bus system 905 in FIG. 9.

It should be understood that, the memory 902 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), a ferromagnetic random access memory (FRAM), a flash memory, a ferromagnetic surface memory, optical disk, or an optical disk, or a compact disc read-only memory (CD-ROM); the ferromagnetic surface memory may be a disk memory or a tape memory. The volatile memory may be a random access memory (RAM), and is used as an external cache. By way of examples but of no limitation, many forms of RAM are available, for example, a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synclink dynamic random access memory (SLDRAM), and a direct rambus random access memory (DRRAM). The memory 902 described in the embodiments of the present disclosure is intended to include but is not limited to these memories and any other suitable type of memory.

The memory 902 in the embodiments of the present disclosure is configured to store various types of data to support the operations of the terminal device 900. Examples of these data include: any computer program used for operating on the terminal device 900, such as an application 9022. The program for implementing the method of the embodiments of the present disclosure may be included in the application 9022.

The method disclosed in the above embodiments of the present disclosure may be applied to the processor 901 or implemented by the processor 901. The processor 901 may be an integrated circuit chip with a signal processing capability, the steps of the foregoing method embodiments may be implemented by a hardware integrated logic circuit or instructions in a software form in the processor 901. The foregoing processor 901 may be a general purpose processor, a digital signal processor (DSP) or another programmable logic device, a transistor logic device, or a discrete hardware component. The processor 901 may implement or execute the methods, steps, and logical block diagrams disclosed in the embodiments of the present disclosure. The general purpose processor may be a microprocessor, or may be any conventional processor, or the like. Steps of the methods disclosed in conjunction with the embodiments of the present disclosure may be directly performed and completed by means of a hardware decoding processor, or may be performed and completed by using a combination of hardware and software modules in the decoding processor. The software module may be located in a storage medium, and the storage medium is located in the memory 902, and the processor 901 reads information in the memory 902 and completes the steps in the foregoing method embodiments in combination with hardware of the processor.

In an exemplary embodiment, the terminal device 900 may be implemented by one or more application specific integrated circuits (ASIC), DSPs, programmable logic devices (PLD), and complex programmable logic devices (CPLD), FPGAs, general-purpose processors, controllers, MCUs, MPUs, or other electronic components to implement the aforementioned method.

The embodiments of the present application also provide a storage medium for storing a computer program.

Optionally, the storage medium may be applied to the terminal device in the embodiments of the present application, and the computer program causes a computer to carry out the corresponding process in each method of the embodiments of the present application, which will not be repeated here for the sake of brevity.

Optionally, the storage medium may be applied to the network device in the embodiments of the present application, and the computer program causes a computer to carry out the corresponding process in each method of the embodiments of the present application, which will not be repeated here for the sake of brevity.

The present disclosure is described with reference to flowcharts and/or block diagrams of the methods, the device (system), and the computer program product according to the embodiments of the present disclosure. It should be understood that each process and/or block in the flowcharts and/or block diagrams, and the combination of processes and/or blocks in the flowcharts and/or block diagrams may be implemented through computer program instructions. These computer program instructions may be provided to a processor of a general-purpose computer, a special-purpose computer, an embedded processing machine or other programmable data processing devices to generate a machine, so that the instructions executed by the processor of the computer or other programmable data processing devices generate means for realizing the functions specified in one or more processes in the flowchart and/or one or more blocks in the block diagram.

These computer program instructions can also be stored in a computer-readable memory that can guide a computer or other programmable data processing devices to operate in a specific manner, so that the instructions stored in the computer-readable memory generate an article of manufacture including the instruction device, and the instruction device realizes the functions specified in one or more processes in the flowchart and/or one or more blocks in the block diagram.

These computer program instructions can also be loaded onto a computer or other programmable data processing devices, so that a series of operation steps are executed on the computer or other programmable devices to produce computer-implemented processing, so that instructions executed on the computer or other programmable devices provide steps for implementing the functions specified in one or more processes in the flowchart and/or one or more blocks in the block diagram.

Those described above are only preferred embodiments of the present disclosure and are not used to limit the protection scope of the present disclosure. Any modification, equivalent replacement and improvement, etc. made within the spirit and principle of the present disclosure should be included in the protection scope of the present disclosure.

What is claimed is:

1. A data transmission method, comprising:
   determining, by a terminal device, according to states of a first timer and a second timer corresponding to a hybrid automatic repeat request (HARQ) process, whether the HARQ process corresponding to a first configured grant resource is available for transmitting data to be transmitted;
   performing, by the terminal device, no new transmission on the HARQ process during running time of the first timer, and performing, by the terminal device, no retransmission on the HARQ process during running time of the second timer;
   receiving, by the terminal device, transmission feedback for the transmitted data of the HARQ process sent by a network device during the running time of the first timer and the second timer;
   controlling, by the terminal device, the state of the first timer and the state of the second timer according to the transmission feedback;
   setting, by the terminal device according to the transmission feedback, a feedback variable corresponding to the HARQ process, comprising:
      setting the feedback variable to a first value in a case where the transmission feedback is first feedback, wherein the first feedback indicates that the transmitted data is successfully received by the network device; or
      setting the feedback variable to a second value different from the first value in a case where the transmission feedback is second feedback, wherein the second feedback indicates that the transmitted data is not successfully received by the network device;
   receiving, by the terminal device, downlink control information (DCI), for scheduling a second configured grant resource, sent by the network device;
   starting or restarting the first timer and stopping the second timer by the terminal device in response to the DCI; and
   transmitting, by the terminal device, data indicated by the DCI based on the second configured grant resource,
   wherein the data indicated by the DCI is retransmitted data in a case where the DCI indicates the retransmission; or
   the data indicated by the DCI is non-retransmitted data in a case where the DCI indicates new transmission of second data.

2. The method according to claim 1, wherein a duration of the first timer is greater than a duration of the second timer.

3. The method according to claim 1, wherein the method further comprises:
   starting, by the terminal device, the first timer and the second timer when determining that the HARQ process corresponding to the first configured grant resource is available for the new transmission.

4. The method according to claim 1, wherein the determining, by the terminal device, according to the states of the first timer and the second timer corresponding to the HARQ process, whether the HARQ process corresponding to the first configured grant resource is available for transmitting the data to be transmitted comprises that:
   transmission of the data to be transmitted is not performed by the HARQ process corresponding to the first configured grant resource in a case where the state of the first timer is running and the state of the second timer is running; and
   the HARQ process corresponding to the first configured grant resource is available for transmitting the data to be transmitted in a case where the state of the first timer is stopped or the state of the second timer is stopped.

5. The method according to claim 4, wherein, in the case where the HARQ process corresponding to the first configured grant resource is available for transmitting the data to be transmitted, the method further comprises:
   determining a transmission manner of the data to be transmitted according to the state of the first timer and the state of the second timer.

6. The method according to claim 5, wherein the determining the transmission manner of the data to be transmitted according to the state of the first timer and the state of the second timer comprises:
   determining that the transmission manner is the new transmission in a case where the state of the first timer is stopped and the state of the second timer is stopped; or
   determining that the transmission manner is the retransmission in a case where the state of the first timer is running and the state of the second timer is stopped.

7. The method according to claim 5, wherein the method further comprises:
   controlling, by the terminal device, transmission of the data to be transmitted according to the transmission manner.

8. The method according to claim 6, wherein, in a case where the transmission manner is the retransmission, the method further comprises:
   restarting, by the terminal device, the second timer.

9. The method according to claim 1, wherein the controlling the state of the first timer and the state of the second timer according to the transmission feedback comprises:
   stopping running of the first timer and stopping running of the second timer in a case where the transmission feedback is first feedback, wherein the first feedback indicates that the transmitted data is successfully received by the network device; or
   stopping running of the second timer in a case where the transmission feedback is second feedback, wherein the second feedback indicates that the transmitted data is not successfully received by the network device.

10. A terminal device, comprising:
   a transceiver;
   a processor; and
   a memory configured to store a computer program executable by the processor, wherein the processor is configured to execute the computer program to cause the terminal device to:
determine, according to states of a first timer and a second timer corresponding to a hybrid automatic repeat request (HARQ) process, whether the HARQ process corresponding to a first configured grant resource is available for transmitting data to be transmitted, wherein no new transmission is performed by the terminal device on the HARQ process during running time of the first timer, and no retransmission is performed by the terminal device on the HARQ process during running time of the second timer;
receive transmission feedback for the transmitted data of the HARQ process sent by a network device during the running time of the first timer and the second timer;
control the state of the first timer and the state of the second timer according to the transmission feedback;
set a feedback variable corresponding to the HARQ process according to the transmission feedback, comprising:
setting the feedback variable to a first value in a case where the transmission feedback is first feedback, wherein the first feedback indicates that the transmitted data is successfully received by the network device; or
setting the feedback variable to a second value different from the first value in a case where the transmission feedback is second feedback, wherein the second feedback indicates that the transmitted data is not successfully received by the network device;
receive downlink control information (DCI), for scheduling a second configured grant resource, sent by the network device;
start or restart the first timer and stop the second timer in response to the DCI; and
transmit data indicated by the DCI based on the second configured grant resource,
wherein the data indicated by the DCI is retransmitted data in a case where the DCI indicates the retransmission; or
the data indicated by the DCI is non-retransmitted data in a case where the DCI indicates new transmission of second data.

11. The terminal device according to claim 10, wherein a duration of the first timer is greater than a duration of the second timer.

12. The terminal device according to claim 10, wherein the processor is configured to execute the computer program to further cause the terminal device to start the first timer and the second timer when the terminal device determines that the HARQ process corresponding to the first configured grant resource is available for new transmission.

13. The terminal device according to claim 10, wherein the processor is configured to execute the computer program such that:
transmission of the data to be transmitted is not performed by the HARQ process corresponding to the first configured grant resource in a case where the state of the first timer is running and the state of the second timer is running; and
the HARQ process corresponding to the first configured grant resource is available for transmitting the data to be transmitted in a case where the state of the first timer is stopped or the state of the second timer is stopped.

14. The terminal device according to claim 13, wherein the processor is configured to execute the computer program to further cause the terminal device to: determine a transmission manner of the data to be transmitted according to the state of the first timer and the state of the second timer in a case where the HARQ process corresponding to the first configured grant resource is available for transmitting the data to be transmitted.

15. The terminal device according to claim 14, wherein the processor is configured to execute the computer program to further cause the terminal device to:
determine that the transmission manner is the new transmission in a case where the state of the first timer is stopped and the state of the second timer is stopped; or
determine that the transmission manner is the retransmission in a case where the state of the first timer is running and the state of the second timer is stopped.

16. The terminal device according to claim 14, wherein the processor is configured to execute the computer program to further cause the terminal device to control transmission of the data to be transmitted according to the transmission manner.

17. The terminal device according to claim 15, wherein the processor is configured to execute the computer program to further cause the terminal device to restart the second timer in a case where the transmission manner is the retransmission.

18. A non-transitory computer-readable storage medium comprising instructions which, when executed by a computer, cause the computer to carry out a data transmission method, the method comprising:
determining according to states of a first timer and a second timer corresponding to a hybrid automatic repeat request (HARQ) process, whether the HARQ process corresponding to a first configured grant resource is available for transmitting data to be transmitted;
performing no new transmission on the HARQ process during running time of the first timer, and performing no retransmission on the HARQ process during running time of the second timer;
receiving transmission feedback for the transmitted data of the HARQ process sent by a network device during the running time of the first timer and the second timer;
controlling the state of the first timer and the state of the second timer according to the transmission feedback;
setting, according to the transmission feedback, a feedback variable corresponding to the HARQ process, comprising:
setting the feedback variable to a first value in a case where the transmission feedback is first feedback, wherein the first feedback indicates that the transmitted data is successfully received by the network device; or
setting the feedback variable to a second value different from the first value in a case where the transmission feedback is second feedback, wherein the second feedback indicates that the transmitted data is not successfully received by the network device;
receiving downlink control information (DCI), for scheduling a second configured grant resource, sent by the network device;
starting or restarting the first timer and stopping the second timer in response to the DCI; and
transmitting data indicated by the DCI based on the second configured grant resource,
wherein the data indicated by the DCI is retransmitted data in a case where the DCI indicates the retransmission; or the data indicated by the DCI is non-retransmitted data in a case where the DCI indicates new transmission of second data.

\* \* \* \* \*